US009203821B2

United States Patent
Robison et al.

(10) Patent No.: US 9,203,821 B2
(45) Date of Patent: Dec. 1, 2015

(54) AUTOMATIC CONTEXT AWARE PRELOADING OF CREDENTIAL EMULATOR

(71) Applicant: Google Inc., Mountain View, CA (US)

(72) Inventors: Austin Robison, Palo Alto, CA (US); Ben Poiesz, Santa Clara, CA (US); Melissa Frank, Los Altos, CA (US)

(73) Assignee: Google Inc., Mountain View, CA (US)

(*) Notice: Subject to any disclaimer, the term of this patent is extended or adjusted under 35 U.S.C. 154(b) by 275 days.

(21) Appl. No.: 13/971,415

(22) Filed: Aug. 20, 2013

(65) Prior Publication Data

US 2015/0058940 A1 Feb. 26, 2015

(51) Int. Cl.
*H04L 29/06* (2006.01)
*H04W 4/00* (2009.01)
*G06Q 20/34* (2012.01)

(52) U.S. Cl.
CPC .............. *H04L 63/08* (2013.01); *G06Q 20/351* (2013.01); *H04L 2463/081* (2013.01); *H04L 2463/102* (2013.01); *H04W 4/008* (2013.01)

(58) Field of Classification Search
CPC .............. H04L 63/08; H04L 2463/081; H04L 2463/102; H04W 4/008; G06Q 20/351; G06Q 20/356–20/3567
See application file for complete search history.

(56) References Cited

U.S. PATENT DOCUMENTS 7,930,249 B2 4/2011 Roberts
8,321,246 B1 11/2012 Shah
2003/0063779 A1* 4/2003 Wrigley ........................ 382/116
2006/0218503 A1* 9/2006 Matthews et al. ............ 715/779
2009/0037326 A1* 2/2009 Chitti et al. ..................... 705/39
2010/0323678 A1 12/2010 Corda et al.
2012/0265685 A1* 10/2012 Brudnicki et al. .............. 705/44
2013/0084798 A1 4/2013 Faithorn
2013/0290339 A1* 10/2013 LuVogt et al. ................ 707/740

* cited by examiner

*Primary Examiner* — Linglan Edwards
*Assistant Examiner* — Kevin Bechtel
(74) *Attorney, Agent, or Firm* — Shumaker & Sieffert, P.A.

(57) ABSTRACT

Implementations of the present disclosure provide systems and methods for automatically preloading data pertaining to credentials determined to be likely to be used during a particular time interval into a memory utilized by a credential emulator. The systems and methods described herein contemplate identifying a particular time interval by identifying events that may designate the beginning and end of that particular time interval, identifying contextual information relevant to the client device or a user account affiliated with the client device during the time interval, identifying a set of credentials available for loading into the memory utilized by the credential emulator, determining from the set of credentials, a subset composed of individual credentials that are likely to be used during the time interval, and loading data pertaining to individual credentials in the subset into the memory utilized by the emulator.

20 Claims, 8 Drawing Sheets

Network
103
Credential Management Server
104
Client 1
101A
Client 2
101B
107B
107A
Database
105
Reader 1
102A
Reader 2
102B

AUTOMATIC CONTEXT AWARE PRELOADING OF CREDENTIAL EMULATOR

BACKGROUND

Advances in digital payment technologies have decreased inconvenience inherent to the execution of payment and identification transactions. Such technologies have facilitated, inter alia, widespread acceptance of credit cards thereby enabling consumers to purchase a myriad of products and services without enduring inconveniences associated with carrying cash or bills of exchange. Similarly, digital identification and credentialing technologies have eliminated the necessity of printing and carrying physical tickets or vouchers thereby enabling users of such technologies to gain access to events and acquire services with nothing more than a mobile computerized device and data stored thereon. Thus, the digitization of identification documents has also decreased inconvenience inherent to identification procedures at transit terminals, at sports stadiums, at entertainment venues, and at other establishments that require documentation of a preexisting reservation or prior purchase.

More recently, digital wallet technologies have further streamlined the execution of payment and identification transactions. Digital wallet software enables consumers to enter payment and identification information into a computerized device through a user interface, to store that information in a secure and encrypted manner at the device or at a database communicatively connected to the device, and to communicate that information in a secure and encrypted manner when necessary for the execution of a transaction. Such digital wallet software can be executed by a client device, such as a smart phone. Digital wallet software can utilize hardware at the client device to establish the communicative connections necessary to execute payment and identification transactions. For example, hardware enabling a radio frequency identification (RFID) procedure through, e.g. near field communication (NFC) protocols, may enable a client device to transmit credit card payment information to a credit card reader.

SUMMARY

Implementations of the present disclosure provide systems and methods for the automatic context aware preloading of data pertaining to one or more credentials into memory assigned to a credential emulator. The present disclosure describes identifying one or more credentials likely to be used by the credential emulator during a particular time interval. In various implementations, the identified credentials likely to be used during the time interval are members of a set of credentials that includes all credentials associated with a particular client device or with a particular user account. The identification of the members of the set that are likely to be used during the future time interval may involve utilizing data indicative of the context of the client device, data indicative of the context of a user of the client device during the time interval, and a combination thereof. Data pertaining to historical credential usage by the client device or a user account linked to the client device under circumstances similar to circumstances likely to be experienced during the time interval may be used to determine the members of the set. In some implementations, crowd sourced data pertaining to credential usage by various client devices or various users under circumstances similar to those likely to be experienced during the time interval may also be utilized to determine the members of the set. In some implementations, the identification of the members of the set of credentials likely to be used by the credential emulator during the particular time interval involves utilizing a combination of historical credential usage data obtained from a particular client device or a particular user account and contextual credential usage data crowd-sourced from various other user accounts or client devices.

One implementation involves a method, implemented at a processor, for automatically loading data representing one or more credentials into a cache of a credential emulator located at a client, the method comprising acquiring contextual information pertaining to one or more of the group consisting of: the client, a user account affiliated with the client, and a user of the client, detecting an event that triggers the loading of data representing one or more credentials into the cache of the credential emulator, identifying a set of credentials for which representative data is capable of being loaded into the cache of the credential emulator, acquiring historical credential usage data, and selecting, from the set of credentials, a subset of the credentials for loading into the credential emulator, wherein the subset is composed of members of the set of credentials determined to be likely to be used by the credential emulator during a time interval based on an analysis of the contextual information and the historical credential usage data.

An additional implementation involves a system for presenting credentials to a credential reader, the system comprising a credential emulator located at a mobile device configured to transmit credentials to a credential reader through a close-range communication connection, the credential emulator having a cache configured to store data representative of one or more credentials, one or more data stores configured to store data pertaining to a group of multiple individual credentials that constitute a set of available credentials, and a processor configured to transmit instructions to the credential emulator to load a subset of the set of credentials stored at the one or more data stores, the processor configured to receive contextual information pertaining to one of the group consisting of: the credential emulator, the mobile device at which the credential emulator is located, a user account associated with the mobile device at which the credential emulator is located, and a user of the mobile device at which the credential emulator is located, and determine, from the contextual information, a subset of the credentials stored at the one or more one or more data stores, the subset comprising credentials likely to be transmitted by the credential emulator to a credential reader during a forward-looking time window.

A further implementation involves a computer readable medium configured with computer executable instructions for automatically loading data representing one or more credentials into a cache of a credential emulator located at a client, the instructions comprising instructions for: acquiring contextual information pertaining to one or more of the group consisting of: the client, a user account affiliated with the client, and a user of the client, detecting an event that triggers the loading of data representing one or more credentials into the cache of the credential emulator, identifying a set of credentials for which representative data is capable of being loaded into the cache of the credential emulator, acquiring historical credential usage data, and selecting, from the set of credentials, a subset of the credentials for loading into the credential emulator, wherein the subset is composed of members of the set of credentials determined to be likely to be used by the credential emulator during a time interval based on an analysis of the contextual information and the historical credential usage data.

DETAILED DESCRIPTION

Figure 1:
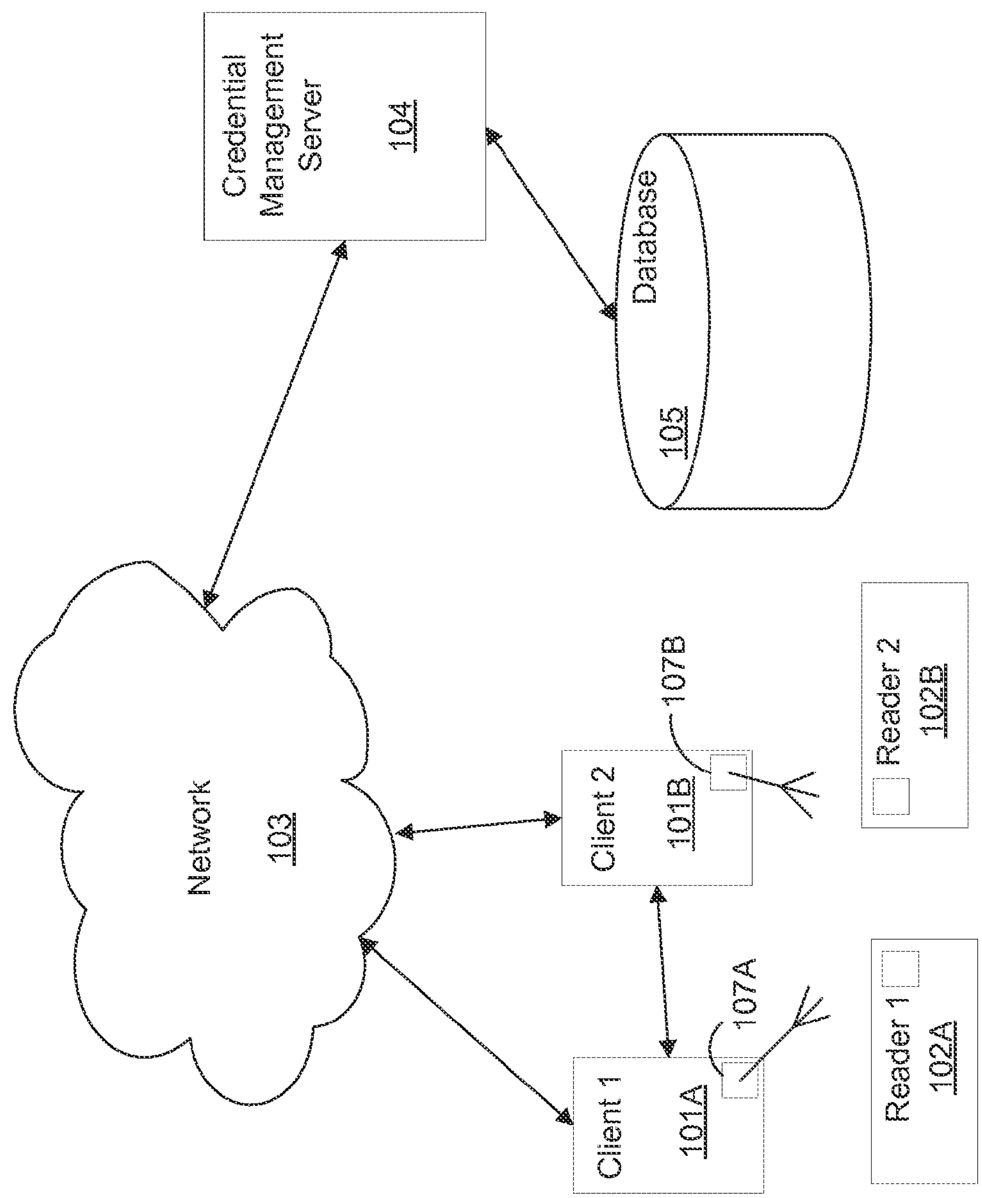
FIG. 1 is a block diagram of an example environment in which the methodology for automatically loading data pertaining to credentials likely to be used during a particular time interval into one or more memories utilized by one or more credential emulators located at one or more client devices may be implemented.

FIG. 1 is a block diagram of an example environment in which the methodology for automatically loading data pertaining to credentials likely to be used during a future time interval into one or more memories utilized by one or more credential emulators located at one or more client devices may be implemented. In the example environment depicted in FIG. 1, multiple clients 101 are connected to a network 103. Clients 101 are equipped with close-range communication elements 107. The close range communication elements enable clients 101 to establish communicative connections when they are brought into close proximity of other devices capable of establishing a close range communicative connection, such as credential readers 102. The close range communicative connection may be established through a near field communications (NFC) protocol or through a variety of other protocols. The multiple clients 101 are connected to a credential management server 104 through a data network 103. The credential management server 104 is additionally connected to database 105. Database 105 may store data pertaining to one or more credentials affiliated with one of the clients 101. Any of clients 101 may be a smart phone, a personal digital assistant (PDA), a tablet computer, a wearable computer, a laptop computer, a video-game console, or any one of a number of additional devices that may establish communicative connections with other devices capable of establishing a close range communicative connection.

The example environment also contains a network 103 that connects the multiple clients 101 to the credential management server 104. The network 103 may be either a wired or a wireless network, and may include elements of a cellular network, a voice over internet protocol (VoIP) network, a public switched telephone network (PSTN), or a combination thereof. Example networks include but are not limited to a long term evolution (LTE) network, a global system for mobile communications (GSM) network, a code division multiple access (CDMA) network, a fiber optic network, and other voice or data networks. The network 103 may also include elements of wireless local area network (WLAN) or wireless personal area network (WPAN) networks that enable clients 101 to connect to other components of the network, for example an LTE network. The network 103 allows the multiple clients 101 to communicate with the credential management server 104. For example, the clients 101 may transmit information to the credential management server 104 and receive information from the credential management server 104. In particular, the clients 101 may create both voice and data packets and transmit such data packets through the network 103. The network 103 may include a set of cell towers, as well as a set of base stations and/or mobile switching centers (MSCs). As appreciated by those skilled in the art, the network 103 may include various cell tower/base station/MSC arrangements. For example, a base station and a cell tower could be co-located at the same site or they could be remotely located, and a single base station could be coupled to various cell towers or various base stations could be coupled to a single MSC, to name but a few of the possible arrangements. Alternatively or in addition to the aforementioned components of the network 103, the network 103 may include one or more IP multimedia subsystems (IMS), serving gateways (SGW), and evolved node Bs (eNB). One of ordinary skill in the art will recognize that additional components not mentioned herein may be used by the network 103.

Credential management server 104 comprises processors and memory configured to receive information from the clients 101 and to provide information to the clients 101. The information received by the credential management server 104 may include data pertaining to a user account affiliated with the client device, data pertaining to contextual information relevant to the client device or a user account affiliated with the client device, and data pertaining to credentials available for loading in a credential emulator at the clients 100. Credential management server 104 may further comprise processors and memory configured to determine the likelihood that one or more credentials are likely to be used by a client, such as client 101A or client 101B, during a particular time interval and to instruct the client to load one or more credentials into a credential emulator. Furthermore, credential management server 104 may be configured to transmit data pertaining to one or more credentials to the clients 101. Processors and memory located at the credential management server 104 may also be configured to both access information stored at a database and to store information at a database, such as database 105. For example, credential management server 104 may be configured to store information pertaining to the contextual information relevant to the clients 101 during time intervals, information pertaining to the credentials available to be loaded into the clients 101, and a variety of other information at the database 105. Furthermore, credential management server 104 may be configured to request data pertaining to one or more credentials linked to a user account or client from the database 105. Access to some information stored at databases may be limited and may require some form of authentication prior to access. For example, data associated with a particular user account may be limited pursuant to the settings of such user account, and credential management server 104 may only access such information under certain circumstances.

Credential management server 104 is also connected to the database 105. The database 105 may store a variety of information, including, e.g., information pertaining to one or more user accounts. Information pertaining to the one or more user accounts may include but is not limited to a user account name, the name of a user to whom the user account belongs, an alias for the user account, verification information for the user account, a social network profile associated with the user account, images associated with the user account, documents and media content associated with the user account, and various user account settings. Furthermore, database 105 may also store a variety of data pertaining to credentials affiliated with the user accounts. For example, data pertaining to credentials stored in a smart wallet belonging to a user account may be stored at the database 105.

Implementations of the present disclosure provide systems and methods for automatically preloading data pertaining to credentials determined to be likely to be used during a particular time interval into a memory utilized by a credential emulator. The systems and methods described herein contemplate identifying a particular time interval by identifying events that may designate the beginning and end of that particular time interval, identifying contextual information relevant to the client device or a user account affiliated with the client device during the time interval, identifying a set of credentials available for loading into the memory utilized by the credential emulator, determining from the set of credentials, a subset composed of individual credentials that are likely to be used during the time interval, and loading data pertaining to individual credentials in the subset into the memory utilized by the emulator.

Implementations of the present disclosure contemplate the use of a client device having a credential emulator and a short range communication element. In some implementations, the short range communication element may be a component of the credential emulator. The client device may be a smart phone, a tablet computer, a wearable computer such as a watch with a computer operating system, an unpowered tag, or any other device capable of storing data pertaining to a credential and transferring the data pertaining to the credential via a short range communicative connection. Such a short range communicative connection may be established pursuant to near field communication (NFC) protocol as well as through alternative short range communication protocols. The credential emulator located at the client device may comprise both hardware and software components. The credential emulator is capable of emulating a variety of credentials including but not limited to identification cards, credit cards, debit cards, prepaid cash cards, loyalty cards, coupons, promotional vouchers, transportation tickets, entertainment tickets, and a variety of other tickets. Some credential emulators contemplated by the present disclosure may only be capable of emulating a subset of such credentials, and other credential emulators may be able to emulate other credentials not listed supra. In some implementations, the credential emulator comprises hardware that includes a memory device for storing data pertaining to the credentials, while in other implementations, the data pertaining to the credentials is stored in a memory device that is not exclusively assigned to the credential emulator. In some implementations, the credential emulator comprises hardware that includes a short range communications element. The credential emulator further comprises software that may be capable of providing security and encryption for both storing the data pertaining to the credential and for transmitting the data pertaining to the credential during the execution of transactions that involve communicating with separate devices that read and verify credentials.

The memory allocated to or utilized by the credential emulator may be limited in the amount of data it can store. The credentials that can be emulated by the credential emulator at any particular point in time may be limited to those stored in a particular memory location assigned to the emulator. Thus, credential emulation may be limited by the amount of data that can be stored in the memory location assigned to the emulator. In some implementations, the credential emulators have a cache of limited capacity capable of storing data pertaining to credentials and serving such data rapidly upon request. If a credential that a user wishes to transmit for verification or receipt by another device is not presently stored in the credential emulator cache when the user wishes to transmit it, delays may result and cause inconvenience to the user as well as to other persons. Such delays may consist of the delay caused by the processing necessary to determine which data to remove from the cache in order to make way for the credential data that is to be written to the cache and by writing the data to the cache. Delay may also result from user interaction with a user interface presented by the device. For example, delay may result when a user scans through a list of available credentials to select a credential to be loaded into the emulator cache.

The present disclosure contemplates automatically preloading data pertaining to credentials that are likely to be used within a particular time interval as determined by contextual information relevant during that time window. A particular time interval may exist entirely in the future or may exist in a combination of the past, present, and future. The beginning and end of a particular time interval may be identified through a variety of different methods. In some implementations, the end of a particular time interval automatically triggers the beginning of a subsequent time interval. The beginning or end of a time interval may be triggered by events including but not limited to the passage of time since the beginning of the current time interval, the passage of a predetermined amount of time since a point of reference, the identification of data generated or stored by an application running on the client device or on a device linked to a particular user account, the determination that the client device has entered a particular geographic region, the detection of an instruction sent from an application running on the client device or on a device linked to a particular user account to begin or end a time interval, or upon the detection of an instruction to begin or end a time interval issued by a user. For example, a determination that the phone has entered a geographic region identified as an airport may trigger the ending of a present time interval and the beginning of a new time interval. In some implementations, geographic regions may be defined pursuant to or based, at least in part, on historical credential usage data from the client device, on historical credential usage data crowd-sourced from a variety of other devices, or on a combination thereof.

In various implementations, the events capable of indicating the end of a time interval may be determined partially by the mechanism or event that designated the beginning of the time interval. For example, if the beginning of a particular time interval was demarcated by the passage of a predetermined amount of time since the beginning of a previous time interval, then the time interval may expire at the end of a predetermined amount of time. As an alternative example, if the beginning of a particular time interval was designated by the client device entering a particular geographic region, the end of the time interval may be designated by an event indicating that the client device has left the particular geographic region. In some implementations, different classes of time intervals may be defined, and rules for determining the mechanism by which time intervals belonging to a class may begin or end may be established. In some implementations, such mechanisms may vary across different classes of time intervals. For example, some time intervals may automatically end and thereby trigger the beginning of a new time interval. However, other time intervals may extend indefinitely: rules may specify that such time intervals may only end upon the occurrence of a particular condition. Time intervals may be designated as "open ended" if their endpoint is contingent upon the occurrence of a condition and may be designated as "closed" if their endpoint is predetermined. In some implementations, rules defining the beginning and end of time intervals may be subject to user control. For example, a user may specify time interval settings at a user account through a user interface. In other implementations, the rules defining the beginning and end of time intervals may not be subject to user control. For example, they may be embedded in an operating system of the client device or an operating system of a server, or they may be embedded in the code for a software program running on the client device or on a server.

In some implementations, the present disclosure contemplates estimating the duration of open-ended time intervals. Different estimation methods may be used for different classes of open-ended time intervals. Historical time interval data may be used to calculate an average duration of time intervals belonging to the class, and the duration of a time interval may be estimated to be the average duration of time intervals that belong to the same class. Similarly, average durations for time intervals whose beginnings were triggered by the same event or by an event from the same category of events, may also be calculated and used to estimate the duration of a forthcoming or present time interval. Time interval duration may also be estimated based on the average duration of time client devices spend in a particular geographic location, or by a variety of other mechanisms. The historical time interval data used to estimate the duration may be acquired from a particular client device or a particular user account, or it may consist of data crowd-sourced from multiple clients. In some implementations, a weighted average of the estimated time interval provided by various time interval estimation methods may be used to calculate the estimated time interval duration. In such implementations, a variety of weighting techniques may be used.

The present disclosure further contemplates identifying contextual information relevant to the client device or to a user affiliated with the client device during the particular time interval. Contextual information may be acquired from a variety of sources. The contextual information may include information provided by or stored through an application running on the client device or through an application running on another device linked to a particular user account. For example, in a scenario where the credential emulator is located at a smart phone, a calendar application running on a desktop computer linked to a user account that is also linked to the smart phone may provide contextual information relevant to determining which credentials are likely to be used during the time interval. Furthermore, data pertaining to the location of the client device at which the credential emulator is located may be acquired and determined to be relevant. For example, a global positioning system (GPS) component in the client device may indicate that the client device is located at a shopping center that includes certain stores. Such information may be relevant in determining that certain payment credentials, such as a credit card and prepaid cash card, as well as certain promotional vouchers and rewards cards, are likely to be used during the forthcoming time interval. Relevant information may also include data provided from a variety of applications running on the client device. For example, an email application may include data, in the form of a purchase confirmation email, indicating that the client is likely to be present at a movie theater within the forthcoming time interval and likely to use a movie ticket credential contained in the email or stored elsewhere. Similarly, a calendar application or a reminder application running on a smart phone may indicate that the user of the client is likely to attend certain events or perform certain tasks requiring use of certain credentials during the time interval.

The present disclosure also contemplates identifying a set of credentials available for use by the credential emulator. In some implementations, data pertaining to credentials that may be loaded into the memory utilized by the emulator may be located at a variety of different storage locations. For example, data pertaining to credentials that may be loaded into the memory utilized by the credential emulator may be located at a memory of the client device on which the credential emulator is located, at a data store associated with a server located remotely from the client device, at a different client device communicatively connected to the client device on which the credential emulator is located (e.g. through a WLAN or WPAN connection), or at any other location communicatively connected to the client device on which the credential emulator is located. In various implementations, credential data located at various locations may include data that is duplicative of data located at other locations. In some implementations, the complete set of credential data may be distributed across multiple data storage locations.

Once each credential in the complete set of credentials available for being used by the credential emulator are identified, the present disclosure contemplates determining which credentials are likely to be utilized by the client device during the forthcoming time interval. In various implementations, different algorithms are used to determine, based on the contextual information identified as relevant during the time interval, which credentials are likely to be used by the client device during that time interval. In some implementations, various pieces of information forming a subset of the relevant contextual information are used to define context scenarios. In other implementations, the entirety of the relevant contextual information is used to determine whether the client fits into a defined context scenario. The likelihood that particular credentials are likely to be used are determined, either solely or in part, based upon the historical credential usage of client devices in the same or similar context scenarios. The historical credential usage data may be crowd-sourced credential usage data indicating credential usage by various client devices in the same or similar context scenarios, may be credential usage data provided by the client device or by a user account affiliated with the client device, or may be a combination thereof. In implementations where the likelihood that particular credentials are likely to be used is determined based upon a combination of historical credential usage provided by the client device and crowd-sourced credential usage data, the weighting given to each component may vary. In some implementations, the weighting given in determinations relevant to future time intervals may be based upon feedback pertaining to credential usage and weightings provided in prior time intervals. Weightings may vary for each individual client device, and may vary for a single client device across different context scenarios. Contextual information not taken into account for the purpose of determining a context scenario may be utilized to adjust the baseline likelihood, as provided by the context scenario, that a credential will be utilized during the time interval. Contextual information not taken into account for the purpose of determining a context scenario may also be utilized to identify credentials that are likely to be used during the time interval that are not determined to be likely to be used by the context scenario. Some contextual information may provide a particularly strong indication that a certain credential or group of credentials is likely to be used during a particular time interval. In such cases, that credential or group may have points added to their score in addition to the score provided through any context scenario analysis.

In some implementations, each available credential is provided with a score indicative of the likelihood that the credential will be used during the forthcoming time interval. Scores may be assigned pursuant to the likelihood of use predicted by a context scenario analysis. Some contextual information may provide a particularly strong indication that a certain credential or group of credentials is likely to be used during a particular time interval. In such cases, that credential or group may have points added to their score in addition to the score provided through any context scenario analysis. In implementations where scores are assigned to each credential or to groups of credentials, the scores determine which credentials will be loaded into an emulator cache. For example, the highest scoring credential may be uploaded into the cache allocated to the credential emulator and removed from a list of available credentials. Thereafter, the next highest scoring credential may be loaded and removed from the list and the process will be repeated until the highest scoring remaining credential cannot be loaded into the cache allocated to the credential emulator because the cache has insufficient capacity to store the data corresponding to the credential. In other such implementations, a group of highest scoring credentials with an amount of corresponding data equivalent to or less than the amount of data capable of being stored at the cache is uploaded into the cache. In some of those implementations, a group of credentials including credentials scoring lower than credentials not loaded into the emulator may be loaded into the emulator if the substitution of lower scoring credentials for higher scoring credentials results in a lesser likelihood that a credential not loaded into the cache allocated to the emulator will be used by the client during the time interval. In some implementations, a higher scoring credential may be omitted because the omission enables multiple lower scoring credentials to be loaded into the cache.

In some implementations, the credential emulator cache may contain multiple slots in which credentials may be stored. Such slots may be defined such that each holds a single credential or such that each contains a certain amount of memory in which data pertaining to credentials can be stored. One example implementation could include both static slots, i.e. slots that hold credentials continuously until the credentials are removed or exchanged for other credentials through manual activity of a user, and dynamic slots, i.e. slots that hold credentials which are automatically exchanged for other credentials based on contextual information. Such an example implementation might retain all credentials stored in the dynamic slots until an event indicating that a credential not presently stored in one of the dynamic or static slots is likely to be used. Such an event may trigger the exchange of the credential likely to be used for another credential presently stored in one of the slots. The event may trigger the exchange of all credentials stored in the dynamic slots based upon an analysis of contextual information, the availability of credentials, and the likelihood that various credentials will be used, or the event may merely trigger the exchange of a single credential. The latter case would involve indefinite open-ended time intervals that begin and end each time an event triggering the exchange of new credential for a presently cached credential occurs.

Figure 2:
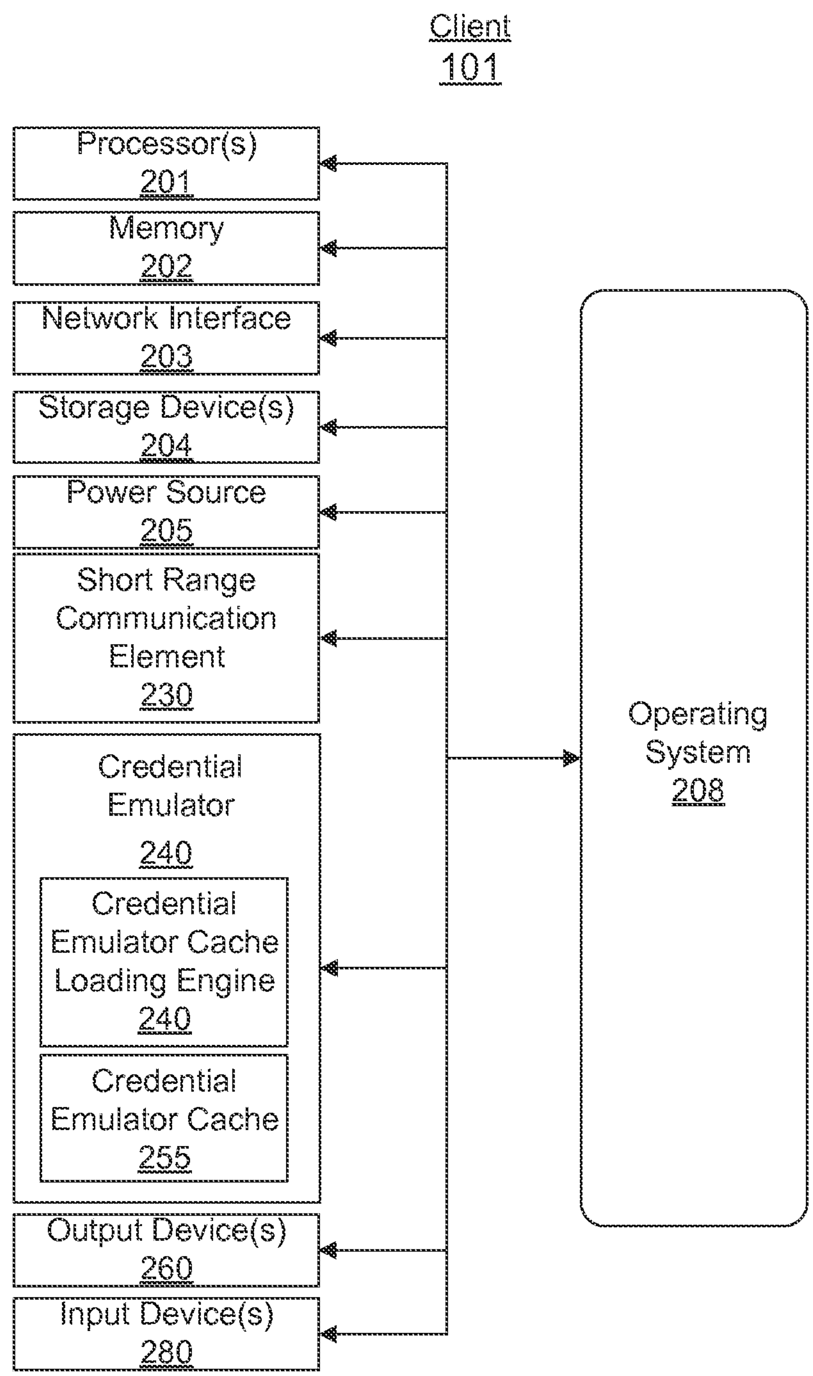
FIG. 2 is a block diagram of the basic functional components for an example client depicted in FIG. 1, according to one aspect of the disclosure.

Turning now to FIG. 2, a block diagram of the basic functional components for an example client of FIG. 1 is depicted. In general, many other embodiments of the client 101 may be used as long as the embodiment is capable of storing data pertaining to a credential and transferring the data pertaining to the credential via a short range communicative connection. In the illustrated embodiment of FIG. 2, the client 101 includes one or more processors 201, memory 202, a network interface 203, one or more storage devices 204, a power source 205, one or more output devices 260, and one or more input devices 280. The client 101 also includes an operating system 208 that is executable by the client 101 and further includes a short range communications element 230 and a credential emulator 240. Credential emulator 240 comprises a credential emulator cache 250 and a credential emulator cache loading engine 255. In a conventional fashion, each of components 201, 202, 203, 204, 205, 240, 250, 260, 280, and 208 are interconnected physically, communicatively, and/or operatively for inter-component communications.

As illustrated, processors 201 are configured to implement functionality and/or process instructions for execution within client 101. For example, processors 201 execute instructions stored in memory 202 or instructions stored on storage devices 204. Memory 202, which may be a non-transient, computer-readable storage medium, is configured to store information within client 101 during operation. In some embodiments, memory 202 includes a temporary memory, i.e. an area for information to be maintained when the client 101 is turned off. Examples of such temporary memory include volatile memories such as random access memories (RAM), dynamic random access memories (DRAM), and static random access memories (SRAM). Memory 202 also maintains program instructions for execution by the processors 201.

The client 101 uses network interface 203 to communicate with external devices via one or more networks, such as the network 103 of FIG. 1. Such networks may include one or more wireless networks, wired networks, fiber optics networks, and other types of networks through which communication between the client 101 and an external device may be established. Network interface 203 may be a network interface card, such as an Ethernet card, an optical transceiver, a radio frequency transceiver, or any other type of device that can send and receive information. Other non-limiting examples of network interfaces include Bluetooth®, 3G and WiFi radios as well as USB interfaces. Furthermore, network interface 203 may be a short range network interface that may conform with near field communication (NFC) protocols.

Storage devices 204 also include one or more non-transient computer-readable storage media. Storage devices 204 are generally configured to store larger amounts of information than memory 202. Storage devices 204 may further be configured for long-term storage of information. In some examples, storage devices 204 include non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The client 101 includes one or more power sources 205 to provide power to the client. Non-limiting examples of power source 205 include single-use power sources, rechargeable power sources, and/or power sources developed from nickel-cadmium, lithium-ion, or other suitable material.

The client 101 includes one or more input devices 280. Input devices 280 are configured to receive input from a user through tactile, audio, and/or video feedback. Non-limiting examples of input device 280 include a presence-sensitive screen, a mouse, a keyboard, a voice responsive system, video camera, microphone or any other type of device for detecting a command from a user. In some examples, a presence-sensitive screen includes a touch-sensitive screen.

One or more output devices 260 are also included in client 101. Output devices 260 are configured to provide output to a user using tactile, audio, and/or video stimuli. Output device 260 may include a display screen (which may be part of a presence-sensitive screen), a sound card, a video graphics adapter card, or any other type of device for converting a signal into an appropriate form understandable to humans or machines. Additional examples of output device 260 include a speaker, a cathode ray tube (CRT) monitor, a liquid crystal display (LCD), or any other type of device that can generate intelligible output to a user.

The client 101 includes an operating system 208, such as the Android® operating system. The operating system 208 controls operations of the components of the client 101. For example, the operating system 208 facilitates the interaction of resource/property tracking engine 240 with processors 201, memory 202, network interface 203, storage device(s) 204, input device 280, output device 260, and power source 205.

The short range communications element 230 enables the client 101 to establish a short range communicative connection with a separate client or with any other device capable of establishing a short range communicative connection with the client 101. The short range communications element 230 may enable short range communicative connections established according to near field communications (NFC) protocol. A short range communications element that enables connections through NFC protocols may be referred to as an NFC element. An NFC element enables the client 101 to perform contactless transactions, data exchange, and simplified setup of more complex communications through short range radio communication according to NFC protocols.

Credential emulator 240 comprises a credential emulator cache 250 and a credential emulator cache loading engine 255. The credential emulator 240 may include both hardware and software components and is capable emulating credentials by storing data pertaining to credentials and transmitting that data to a credential verification system. The credential emulator may emulate credentials that include identification cards, credit cards, debit cards, prepaid cash cards, loyalty cards, coupons, promotional vouchers, transportation tickets, entertainment tickets, and a variety of other tickets. Credential emulator cache 250 is a memory allocated to the credential emulator. The credential emulator cache 250 stores data pertaining to credentials and thereby allows the credential emulator to emulate such credentials. The credential emulator cache loading engine 255 manages the writing of data pertaining to credentials to and the removal of data pertaining to credentials from the credential emulator cache 250.

Figure 3:
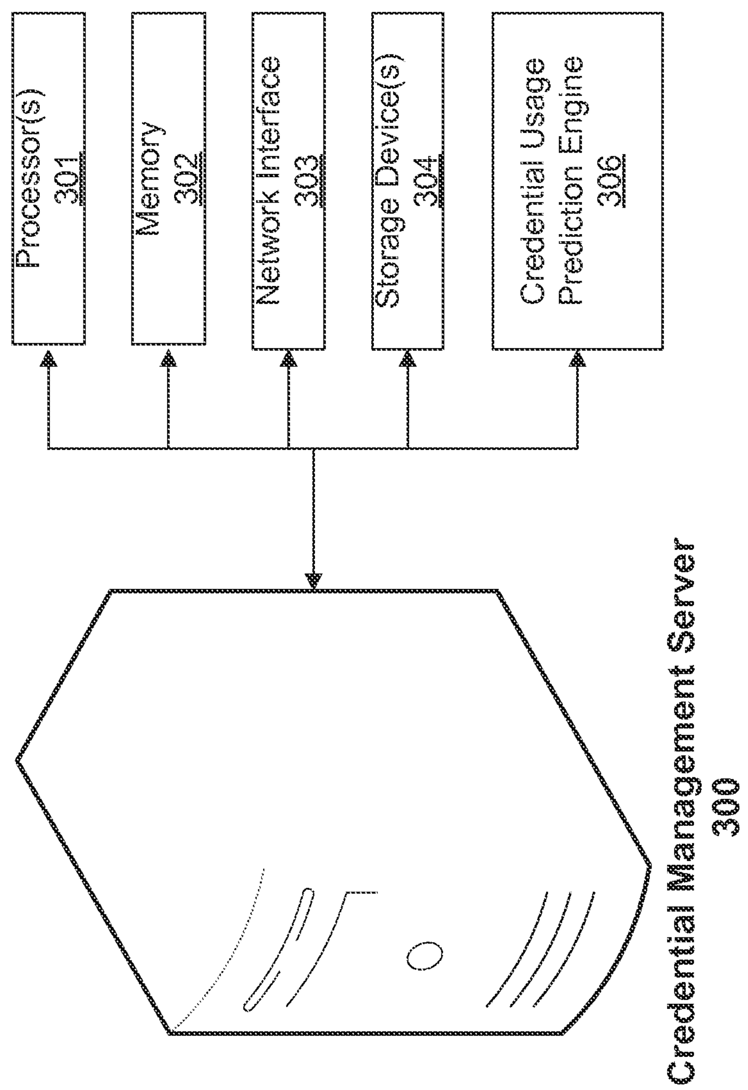
FIG. 3 is a block diagram of the basic functional components for a credential management server depicted in FIG. 1, according to one aspect of the disclosure.

FIG. 3 is a block diagram of the basic functional components for a credential management server depicted in FIG. 1, according to one aspect of the disclosure. The credential management server 300 includes one or more processors 301, memory 302, a network interface 303, one or more storage devices 304, and a credential usage prediction engine 305. In a conventional fashion, each of components 301, 302, 303, 304, and 305 are interconnected physically, communicatively, and/or operatively for inter-component communications.

As illustrated, processors 301 are configured to implement functionality and/or process instructions for execution within credential management server 300. For example, processors 301 execute instructions stored in memory 302 or instructions stored on storage devices 304. Memory 302, which may be a non-transient, computer-readable storage medium, is configured to store information within credential management server 300 during operation. In some embodiments, memory 302 includes a temporary memory, i.e. an area for information to be maintained when the credential management server 300 is turned off. Examples of such temporary memory include volatile memories such as random access memories (RAM), dynamic random access memories (DRAM), and static random access memories (SRAM). Memory 302 also maintains program instructions for execution by the processors 301.

Storage devices 304 also include one or more non-transient computer-readable storage media. Storage devices 304 are generally configured to store larger amounts of information than memory 302. Storage devices 304 may further be configured for long-term storage of information. In some examples, storage devices 304 include non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The credential management server 300 uses network interface 303 to communicate with external devices via one or more networks, such as the network 103 of FIG. 1. Such networks may include one or more wireless networks, wired networks, fiber optics networks, and other types of networks through which communication between the credential management server 300 and an external device may be established. Network interface 303 may be a network interface card, such as an Ethernet card, an optical transceiver, a radio frequency transceiver, or any other type of device that can send and receive information.

Credential usage prediction engine 305 is configured to analyze contextual information pertaining to a client or a user account affiliated with a client in order to determine which credentials capable of being loaded into the client are likely to be used during a particular time interval. The credential usage prediction engine 305 may compute the likelihood that one or more credentials are likely to be used during a particular time interval through a variety of algorithms that account for a variety of information that may be stored at the memory 302, the storage devices 304, or received through the network interface 303.

Figure 4:
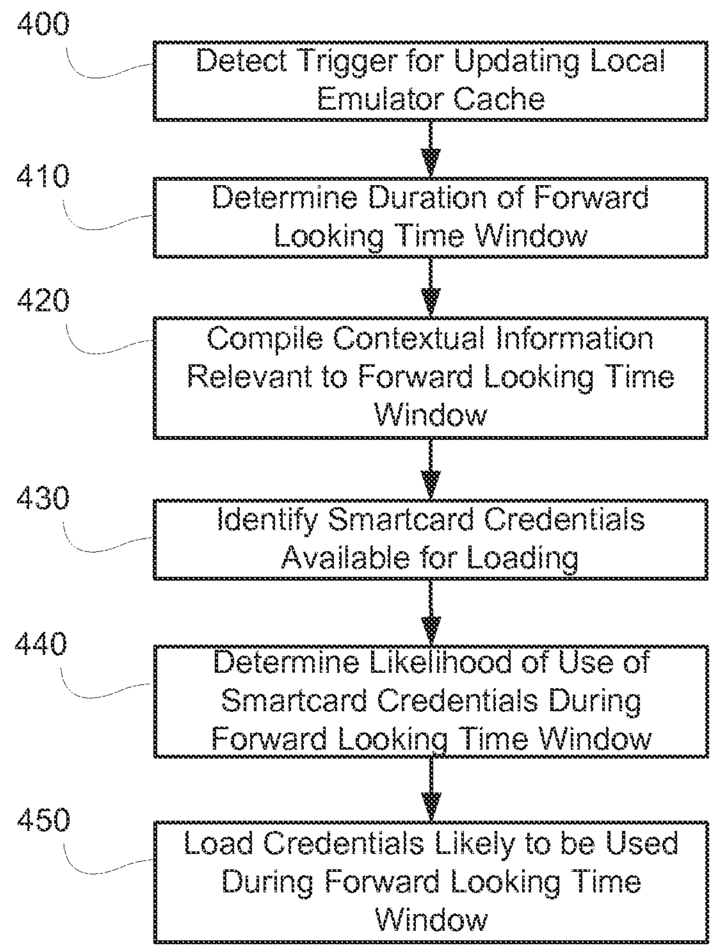
FIG. 4 is a flow diagram illustrating an example method, implemented at a credential management server, for automatic, context-aware preloading of credentials into a memory utilized by a credential emulator located at a client device.

FIG. 4 depicts a flow diagram illustrating an example process, implemented at a credential management server, for automatic, context-aware preloading of credentials into a memory utilized by a credential emulator located at a client device. At 400, the process detects a trigger for updating an emulator cache. Possible triggers include but are not limited to the receipt of an information or data indicating that a time interval is about to begin in the future, the receipt of information or data indicating that a time interval has just begun, the receipt of information or data indicating that a time interval began in the recent past, and the receipt of information or data indicating that some event has just occurred, is presently occurring, or is about to occur at some point in the near future.

At 410, the process identifies a time interval for which the cache update will remain effective. In some implementations, identifying the time interval involves determining the identity of the trigger detected at 400 and determining an event or set of events that designate the beginning or end of a time interval associated with the specific trigger detected at 400 or with a category or class of triggers of which the trigger detected at 400 is a member. In some implementations, determining the duration of a time interval involves estimating the duration of time intervals with similar beginning or ending events. In some implementations, categories, or classes, of time intervals are defined and used to estimate the duration of time intervals in the same category or class. Some time intervals may be closed, i.e. may have a definitive endpoint. The duration of such time intervals may be determined from a simple calculation of the difference in time between the beginning and end of the time interval. Other time intervals may be open-ended, i.e. the endpoint of such time intervals is uncertain. Some open-ended time intervals end upon the occurrence of some condition. For example, a time interval may end upon the client device departing a particular geographic region or upon a particular credential being transmitted by the client device to a credential reader.

At 420, the process aggregates contextual information that will be or is expected to be relevant to credential usage during the time interval identified at step 410. Aggregating contextual information may involve requesting information from the client device and from other client devices affiliated with a user account with which the client device is affiliated and receiving such information from those client devices. Aggregating contextual information may further involve requesting information from a database that stores information pertaining to a particular user account and receiving such information from the database. At 420, the process may receive both information that will be or is expected to be relevant to credential usage during the time interval and information that will not be or is not expected to be relevant to credential usage during the time interval. In such scenarios, the process also determines which information is likely to be relevant during the time interval at 420. Determining which information is likely to be relevant during the time interval at 420 may involve determining the time at location at which the information will be pertinent. For example, the process may receive information at 420 indicating that the client device will be present at a train station at 4:47 PM, but if the process has determined that the time interval will end at 3:30 PM the contextual information involving the train station will not be relevant to credential usage during the time interval.

At 430, the process identifies credentials capable of being loaded into the credential emulator. Identifying the available credentials may involve transmitting a request to the client device and to other client devices affiliated with a user account with which the client device is affiliated, querying a database for information pertaining to the user account, and receiving information from such client devices and from databases. The process may also create a list of identities of the credentials capable of being loaded into the credential emulator which also contains information pertaining to the credentials.

At 440, the process identifies credentials likely to be used during the time interval. In some implementations, the process assigns a score to each of the credentials identified at step 430 where the score is indicative of how likely it is that the credential will be used during the time interval based upon the contextual information aggregated and identified at 420. At 450, the process transmits instructions to the client device to load data pertaining to the credentials identified as likely to be used during the time interval at 440 into the emulator. In some implementations, the process also transmits data pertaining to the credentials themselves to the client device at 450. For example, if the credential data is stored at a database linked to the credential management server, the server may transmit the credential data to the client device. In further implementations, the server may transmit instructions to multiple client devices wherein the instructions direct the client devices to establish a communicative connection between each other and to transmit data pertaining to the credentials from one of the devices to the other. For example, if data pertaining to a credential identified at 440 is stored at a local memory of one client device, the server may transmit instructions to that client device wherein the instructions direct that client device to establish a connection with the client device having the credential emulator and to transmit data pertaining to one or more credentials identified at 440 to the client device having the credential emulator.

Although FIG. 4 is depicted as being implemented at a credential management server, various alternative implementations of the process are possible. In some implementations, some of the process may be executed at the client device having the emulator that is being loaded by the process. For example, the determination of which credentials are likely to be used during the time interval may be performed at the client device. In alternative implementations, various portions of the process may be carried out at one or more client devices while various other portions are carried out at the credential management server. The process depicted in FIG. 4 is only an example and is not intended to limit the scope of the present disclosure.

Figure 5:
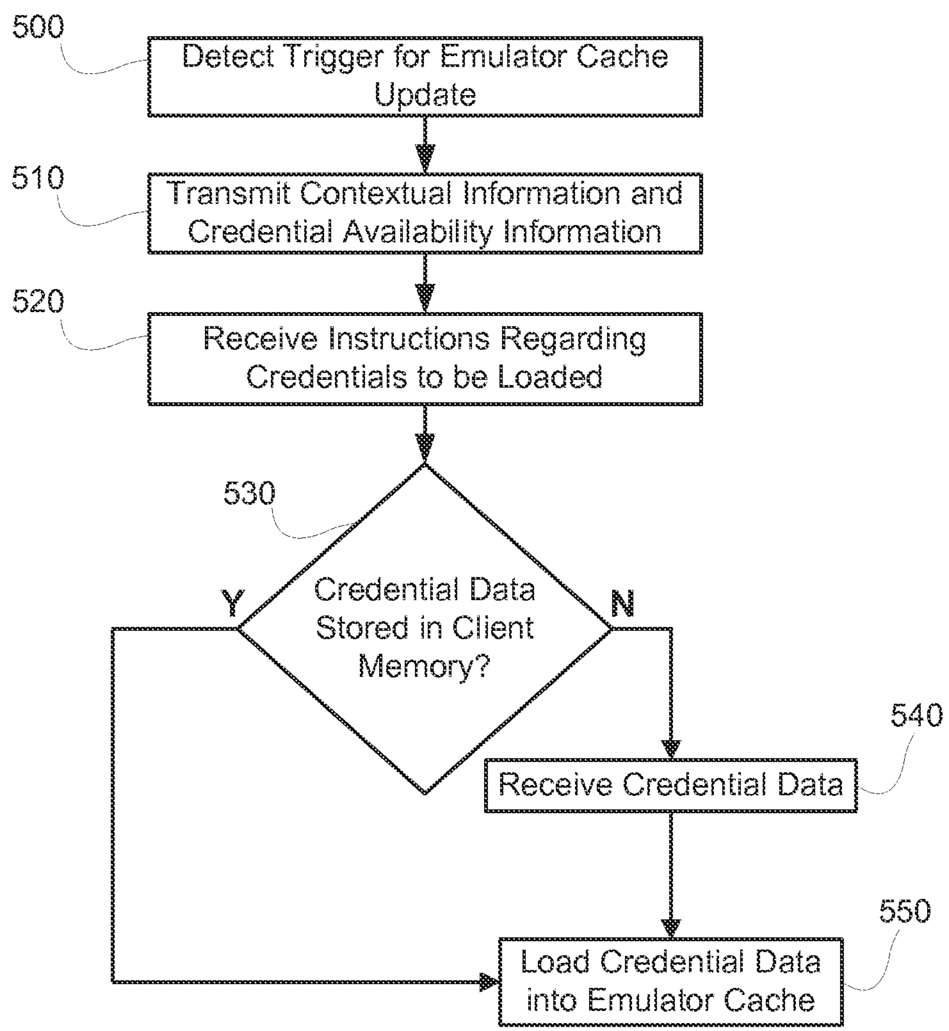
FIG. 5 is a flow diagram illustrating an example method, implemented at a client device, for automatic, context-aware preloading of credentials into a memory utilized by a credential emulator located at a client device.

FIG. 5 is a flow diagram illustrating an example method, implemented at a client device, for automatic, context-aware preloading of credentials into a memory utilized by a credential emulator located at a client device. At 500, the client determines that a trigger has been detected that indicates that the emulator cache should be updated. Possible triggers include but are not limited to the receipt of an information or data indicating that a time interval is about to begin in the future, the receipt of information or data indicating that a time interval has just begun, the receipt of information or data indicating that a time interval began in the recent past, and the receipt of information or data indicating that some event has just occurred, is presently occurring, or is about to occur at some point in the near future. In various implementations, the trigger may be received by the client device, or the trigger may be received by another device communicatively connected to the client device.

At 510, contextual information and credential availability information is transmitted by the client device to a credential management server. Such contextual information may include but is not limited to information provided by or stored through an application running on the client device. Specific examples of such contextual information include but are not limited to GPS location data, data provided by a text messaging application, data provided by a calendar application, data provided by an email application, data provided by a reminders application, and data provided by a calling application. Credential availability information may include information pertaining to the identity of the credentials for which data is stored on the client device as well as additional characteristics of the credential information. The additional characteristics may include a description of the credential or classification information for the credential. For example, credential availability for a credit card credential may include information indicating that the credential is a payment method credential.

At 520, the client device receives instructions regarding credentials to be loaded into the emulator. Such instructions may direct processors at the client device to load data pertaining to specifically identified credentials into a cache affiliated with the credential emulator located at the client device. However, the instructions received at 530 may also direct the client device to perform additional processing in order to identify credentials that should be loaded into the credential emulator. For example, the instructions may include a group of credentials that may be loaded into the credential emulator and further include rules by which the client device should select individual credentials from the group for loading into the client device. The instructions received at 530 may also not specify any particular credentials but instead direct the client device to adhere to certain rules or to apply particular algorithms in selecting credentials from a set of available credentials to load into the emulator.

At 530, the client determines whether or not the data pertaining to the credentials that are to be loaded into the emulator pursuant to the instructions received at 520 are stored in a memory located at the client. If the data pertaining to the credentials is located in a memory located at the client, the process proceeds to 550 where the credential data is loaded into an emulator cache. However, if it is determined that the credential data is not located at the client at 530, the process proceeds to 540 where the credential data is requested and received by the client device. The credential data request may be sent to a credential management server or to another device communicatively linked to the client device having the credential emulator. Once the credential data is received by the client device at 540, the process proceeds to 550 where the credential data is loaded into an emulator cache.

FIG. 5 depicts one example embodiment of a process by which credential information is automatically loaded into a credential emulator based on contextual information. In alternative implementations to the one depicted in FIG. 5, contextual information and credential availability information may be transmitted to the client device from a credential management server and other client devices. In such alternative implementations, the determination of which credentials should be loaded into the emulator may be made at the client device.

Figure 6:
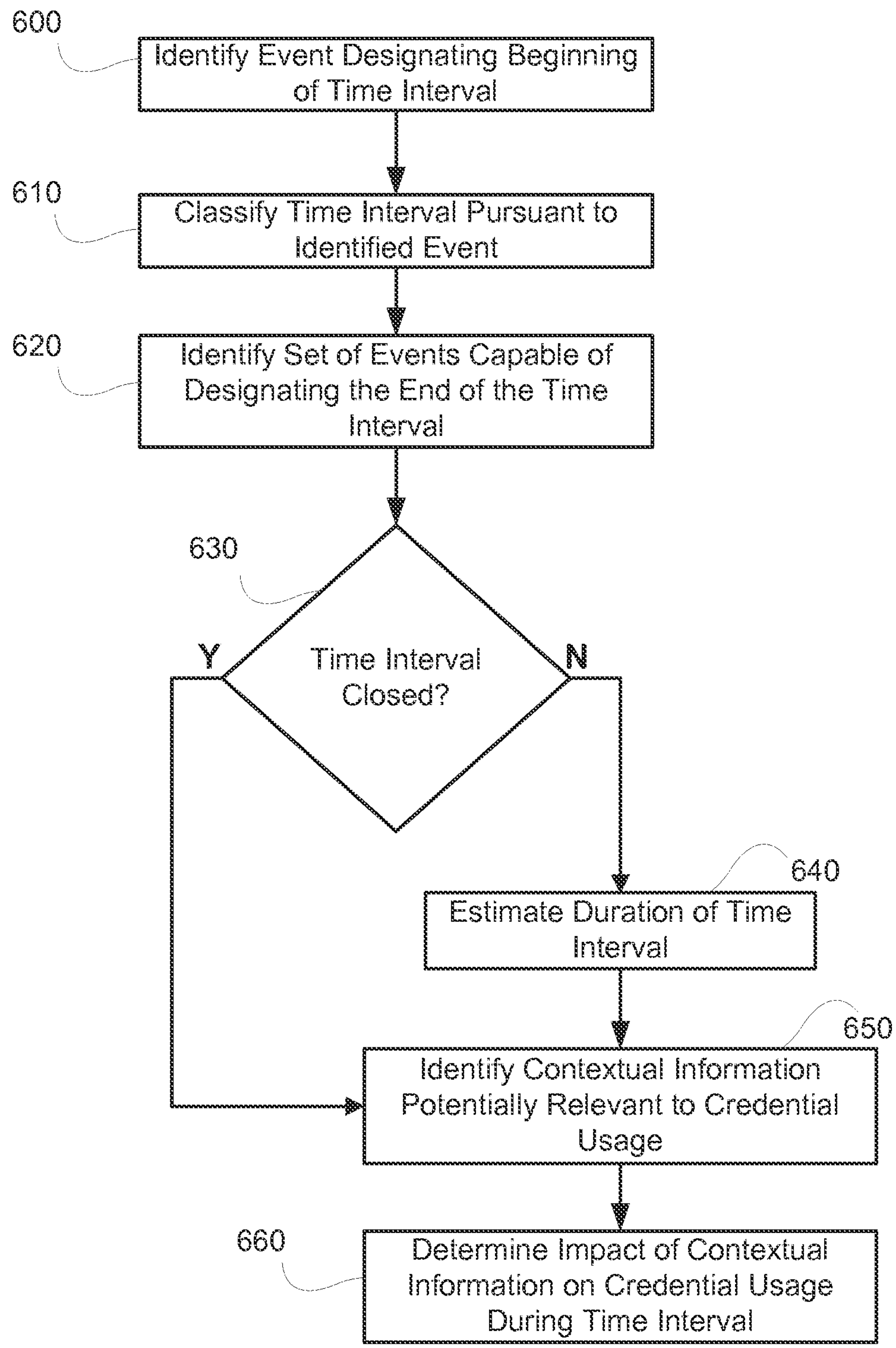
FIG. 6 is a flow diagram illustrating an example method for determining contextual information likely to be relevant to credential usage by a client during a particular time interval.

FIG. 6 is a flow diagram illustrating an example method for determining contextual information likely to be relevant to credential usage by a client during a particular time interval. At 600, an event designating the beginning of a particular time interval is identified. Events capable of designating the beginning of a particular time interval may include but are not limited to data received from an application indicating that a credential is likely to be used by a client device at a particular time or during a particular window of time, data received form an application indicating that a client is likely to be located at a particular place at a particular point in time, and data indicating that a client device has entered a particular geographic region. For the purposes of determining when a particular time interval begins, geographic regions may be defined pursuant to historical credential usage data acquired from the client device itself, historical credential usage data acquired from a user account affiliated with the client device, and historical credential usage data crowd-sourced from multiple client devices. In general, any event that suggests that a client device will engage in one or more payment or identification transactions may be capable of designating the beginning of a particular time interval.

At 610, the time interval is classified pursuant to the event identified as demarcating the beginning of the time interval. In some implementations, classifications for time intervals are determined based solely on the event demarcating the beginning of the interval. In such implementations, the event demarcating the beginning of the time interval may be a member of a group of events and the group is used to classify the time interval. In other implementations, additional information may be used to classify the time interval. In various implementations, criteria by which time intervals are classified may be maintained at a credential management server, at a client device, or in the code for various software programs running at a credential management server or a client device. In some implementations, time intervals are not classified.

At 620, a set of events capable of designating the end of the time interval is identified. In some implementations, the set of events is determined according to the classification of the time interval The set of events may also be determined according to other information relevant to the beginning of the time interval not accounted for in the classification process, possibly in addition to the information accounted for in the classification process. In some implementations, any event capable of designating a new time interval may also be capable of designating the end of the particular time interval. An implementation where all credentials loaded in the emulator remain loaded until an event is identified that dictates that a new credential should be loaded or should replace one of the currently loaded credentials is such an example.

At 630, the process determines whether or not the time interval is closed. If the time interval is closed, i.e. the duration of the time interval is not contingent upon the occurrence of an event, the process proceeds to 650 where contextual information relevant to credential usage during the time interval is identified. However, if the time interval is not closed, the process proceeds to step 640 where the duration of the time interval is estimated. After the duration of the time interval is estimated, the process proceeds to 650 where contextual information relevant to credential usage during the time interval is identified.

At 650, the process identifies contextual information potentially relevant to credential usage. Identifying potentially relevant contextual information may involve querying databases for information pertaining to a user account and requesting information from one or more client devices affiliated with the user account. In various implementations, identifying potentially relevant information may involve requesting information previously identified as potentially relevant information. The previous identification may be performed by one or more client devices, by one or more applications running on the one or more client devices, or by a credential management server or applications running on the credential management server. In other implementations, the process may receive a variety of data from a variety of sources that is not classified as potentially relevant and identify information that may be relevant. In such implementations, the process may request specific categories of types of information from the information sources.

At 660, the process determines the impact of contextual information identified as potentially relevant at 650. In some implementations, contextual information is classified in varying degrees of relevance. Contextual information may be utilized to provide a forecast of likely credential usage during the time interval, and the forecast may be weighted based on the degree of relevance as determined by the classification of the contextual information. In some implementations, each component of contextual information is provided with a relevance score. In some implementations, the relevance scores are calculated, at least in part, by the likelihood that the contextual information will be accurate during the time interval. For example, if the time interval is demarcated by the arrival and departure of a client in a particular geographic region, and the contextual information indicates that the client is likely to engage in a transaction at a store not located in the geographic region, the contextual information will be assigned a low relevance score. However, if the store is located in the particular geographic region, the contextual information will be assigned a high relevance score that may have weigh heavily on including a store rewards card in the emulator cache for that time interval.

Figure 7:
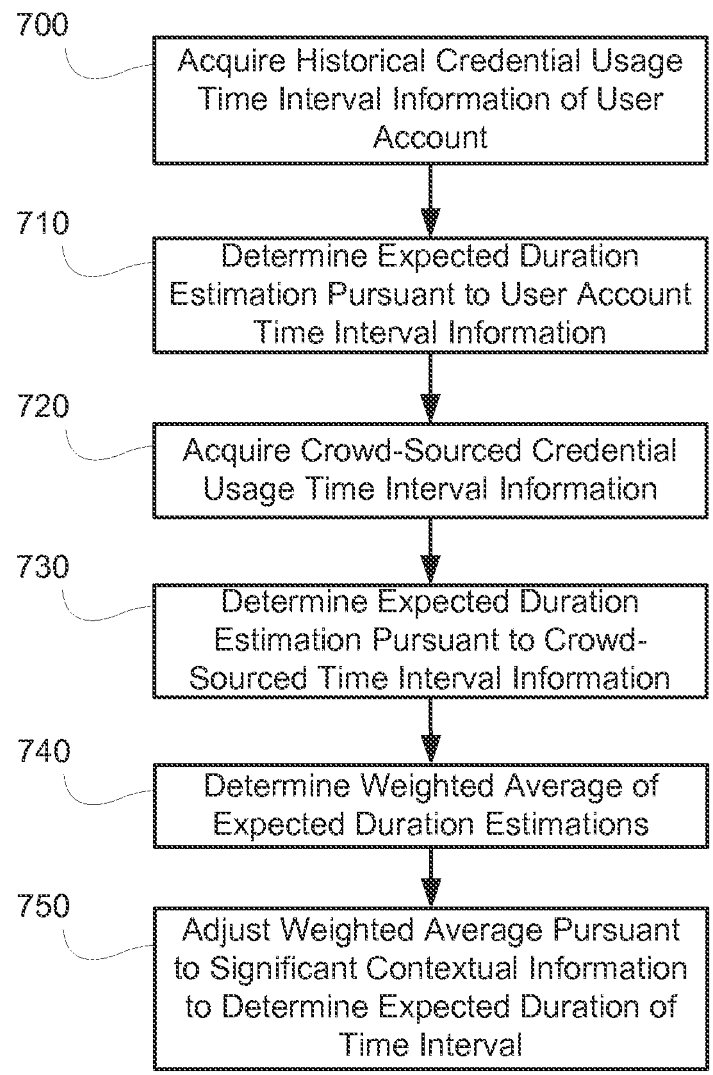
FIG. 7 is a flow diagram illustrating an example method for determining the anticipated duration of a time interval for which credentials are loaded into a credential emulator.

FIG. 7 is a flow diagram illustrating an example method for determining the anticipated duration of a time interval for which credentials are loaded into a credential emulator. At 700, historical credential usage time interval information of a user account is acquired by the process. Such information may be acquired from a client device or from a database that stores information associated with a user account. At 710, an expected duration estimation is made pursuant to the credential usage time interval information acquired from the user account. The expected duration estimation may be made based on the average duration of time intervals that are given the same classification as the time interval for which the duration is being determined. In other implementations, the historical credential usage time interval information of the user account is compared with the characteristics of the current time interval and the estimation of the duration of the current time interval is made based on a comparison with time intervals that had similar durations in the past.

At 720, crowd-sourced credential usage time interval information is acquired by the process. Such information may be acquired from a database or may be built into an algorithm utilized by a software program running on a credential management server. In alternative implementations, the crowd-sourced credential usage time interval information may be acquired from alternative locations. At 730, an expected time interval duration estimation is made pursuant to the crowd-sourced credential usage time interval information. In some implementations, the time interval for which the expected duration is being determined is classified according to various information pertaining to the time interval, and the expected time interval duration estimation is made based on the expected duration of similarly classified time intervals as predicted by the crowd-sourced credential usage time interval information. In alternative implementations, various characteristics of the time interval for which the expected duration is being estimated are taken into account in comparing the present time interval with the crowd-sourced time interval information in order to yield a prediction for the duration of the present time interval.

At 740, the process determines a weighted average of the expected duration estimations yielded by the process at 710 and 730. In various implementations, the individual components may be weighted differently. For example, different weightings may be used based on the similarity of the current time interval with historical credential usage time interval data acquire from the user account and with crowd-sourced credential usage data. At 750, the weighted average calculated at 740 may be adjusted in order to account for significant contextual information in order to generate an expected duration of the time interval. Significant contextual information may include a variety of information that significantly impacts the expected duration of the time interval. For example, information included in a calendar application affiliated with a user account may provide a particularly strong indication that the client device will arrive at an airport at a particular time. If the arrival at the airport would designate the beginning of a new time interval, the weighted average of the expected duration may be adjusted significantly in order to account for the high likelihood that the client device will arrive at the airport at the particular point in time.

Figure 8:
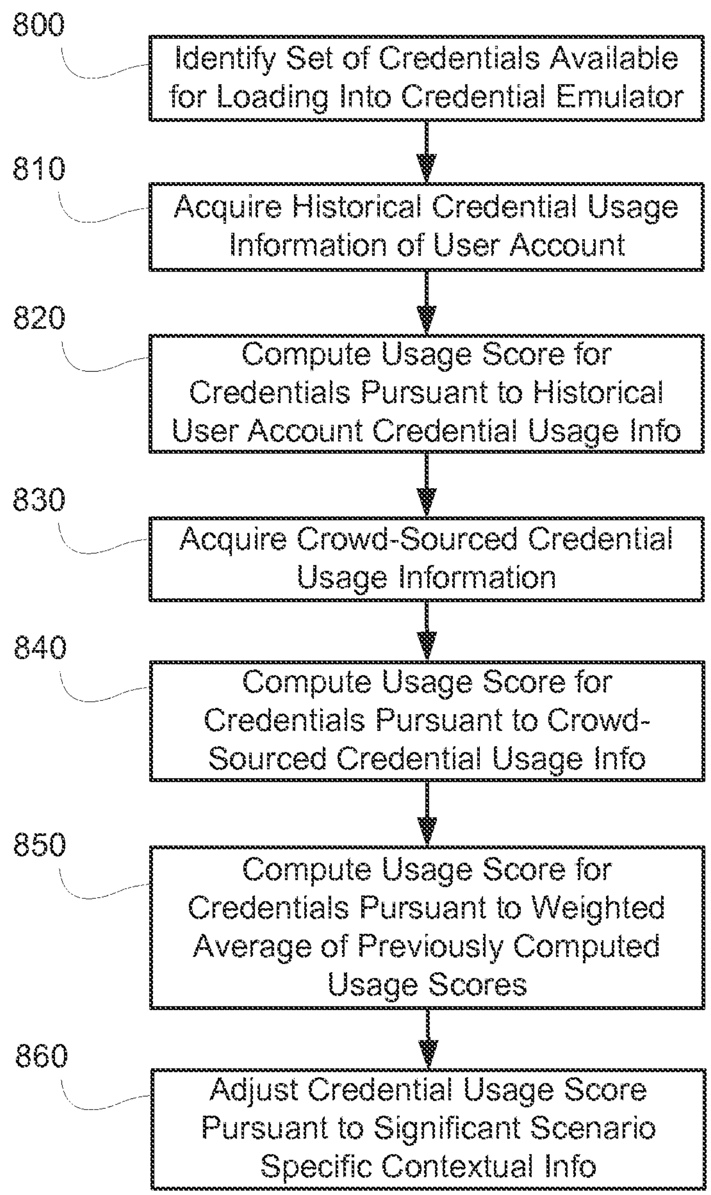
FIG. 8 is a flow diagram illustrating an example method for identifying, from a set of available credentials, a subset of credentials likely to be used during a particular time interval.

FIG. 8 is a flow diagram illustrating an example method for identifying, from a set of available credentials, a subset of credentials likely to be used during a particular time interval. At 800, the process identifies a set of credentials available for loading into a credential emulator located at one or more client devices. The set of available credentials may be composed of individual credentials where the data pertaining to each of the individual credential is located at one or more locations. For example, the data pertaining to some of the individual credentials in the set may be located at a client device, the data pertaining to additional credentials may be located at a distinct client device, and additional data pertaining to further credentials may be located at a data store communicatively connected to a credential management server. Identifying the set of credentials may involve compiling a list of unique identifiers for each individual credential and further involve including information pertaining to each individual credential at the list.

At 810, historical credential usage information pertaining to a user account is acquired by the process. In various implementations, such credential usage information may be acquired from a client device, from a user account data structure stored at a database connected to a credential management server, or from a variety of other locations. At 820, the historical credential usage information acquired at 810 is utilized to compute a usage score for each of the credentials in the set identified at 800. In various implementations, various algorithms may be used to assign scores to each of the credentials in the set. In some implementations, only a subset of the credentials are provided with scores. The context of a client device may be analyzed along a number of dimensions, and historical credential usage under similar circumstances of client devices linked to a user account affiliated with the client device can be used to provide scores indicative of the likelihood that each individual member of the set will be used. Historical usage of particular categories of credentials as well as historical usage of individual credentials may be taken into account during the assignment of scores.

At 830, crowd-sourced credential information is acquired by the process. Crowd-sourced credential information may be acquired from a database or may be built into an algorithm utilized by a software program running on a credential management server or a client device. At 840, the process identifies credentials likely to be used as predicted by the crowd-sourced credential usage information received at 830. In various implementations, various algorithms may be used to assign scores to each of the credentials in the set. In some implementations, only a subset of the credentials are provided with scores. The context of a client device may be analyzed along a number of dimensions, and credential usage under similar circumstances by various client devices as indicated by the crowd-sourced usage data can be used to provide scores indicative of the likelihood that each individual member of the set will be used. Historical usage of particular categories of credentials as well as historical usage of individual credentials may be taken into account during the assignment of scores.

At 850, the usage score for each of the credentials in the set of credentials identified at 800 is provided with a weighted average of the scores produced from crowd-sourced credential information and from historical credential usage information of the user account. At 860, the credential usage scores for various credentials may be adjusted if significant contextual information justifies such adjustments.

It is contemplated that other implementations may differ in detail from the foregoing examples. As such, all references are intended to reference the particular implementation being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to retrieve content (i.e., recorded voicemails) from a content server (i.e., a voicemail server). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as, for example, to a city, ZIP code, or state level), so that a particular location of a user cannot be determined. Thus, the user may have control over how information is collected about him or her and used by the systems discussed herein.

The use of the terms "a" and "an" and "the" and "at least one" and similar referents in the context of describing the disclosed subject matter (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate the disclosed subject matter and does not pose a limitation on the scope of the invention unless otherwise claimed. No language in the specification should be construed as indicating any non-claimed element as essential to the practice of the invention.

Variations of the embodiments disclosed herein may become apparent to those of ordinary skill in the art upon reading the foregoing description. Skilled artisans may employ such variations as appropriate, and the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method, implemented by one or more processing devices, for automatically loading data representing one or more credentials into a cache of a credential emulator located at a client, the method comprising:

- acquiring contextual information indicative of one or more of a context of a client, a context of a user account affiliated with the client, and a context of a user of the client;
- determining, using the contextual information, a context scenario into which the client presently fits, the context scenario defined, at least in part, by geographic location information;
- identifying a set of credentials for which representative data is capable of being loaded into the cache of the credential emulator;
- determining a respective likelihood of use for each credential in the set of credentials based, at least in part, on the context scenario and on data representing past credential usage by multiple other client devices, wherein the data representing past credential usage by multiple other client devices is data representing past credential usage by multiple other client devices during time intervals in which they fit into the same context scenario into which the client presently fits;
- loading, from the set of credentials, a subset of credentials into the cache of the credential emulator, wherein the composition of the subset is based, at least in part, on the respective likelihoods of use, wherein credential emulation is limited to credentials stored in the cache of the credential emulator; and
- emulating the credential via a short range communicative connection to another device.

2. The method of claim 1, wherein the one or more processing devices are located at one or more of the client, a server located remotely from the client, and one or more computerized devices distinct from the client.

3. The method of claim 2, wherein data representative of at least one of the credentials in the set of credentials is located at a device remotely located from the client, and

- wherein the device is selected from a group consisting of: a server, a smart phone, a tablet computer, a wearable computer, a laptop computer, and a desktop computer.

4. The method of claim 3, wherein at least one of the one or more processing devices is located at a server remotely located from the client, and

- wherein data representative of at least one of the credentials in the set of credentials is located at a data store accessible by the server.

5. The method of claim 1, wherein the contextual information includes a member of the group consisting of: a geographic location of the client, a weather forecast, a biometric indicator, an online interaction, and data obtained from a social media profile.

6. The method of claim 1, wherein the respective likelihood of use for each credential in the set of credentials is determined based additionally on past credential usage by the client.

7. The method of claim 6, wherein determining the respective likelihood of use for each credential in the set of credentials comprises:

- determining a respective user-specific likelihood of use for each credential in the set of credentials based on past credential usage by the client;
- determining a respective global likelihood of use for each credential in the set of credentials based on past credential usage by multiple other client devices;
- assigning a respective weighting to each of the respective user-specific likelihoods of use;
- assigning a respective weighting to each of the respective global likelihoods; and
- determining the respective likelihood of use for each credential based on the assigned weightings.

8. The method of claim 1, wherein the respective likelihood of use for each credential in the set of credentials is a score indicative of a probability that the credential will be used.

9. The method of claim 1, wherein the cache of the credential emulator contains both static slots and dynamic slots, wherein static slots hold data representative of credentials continuously until the credentials are removed or exchanged for other credentials through manual activity of a user and dynamic slots hold data that is automatically exchanged, based on contextual information, for data representative of other credentials.

10. The method of claim 1, wherein the respective likelihood of use for each credential in the set of credentials is a score indicative of a probability that the credential will be used, and wherein the score is determined based, at least in part, on the context scenario.

11. The method of claim 1, wherein determining the respective likelihood of use for each credential in the set of credentials includes:

determining a respective relevance score for each component of the contextual information, and determining the respective likelihood of use for each credential in the set of credentials based on the respective relevance scores determined for one or more components of the contextual information.

12. The method of claim 11, wherein determining the respective relevance score for each component of the contextual information is based, at least in part, on a likelihood that the contextual information will be accurate during a time interval.

13. The method of claim 11, wherein determining the respective relevance score for each component of the contextual information includes:

determining that a first component of contextual information indicates that the client is likely to engage in an action at a first geographic location;

assigning a low relevance score to the first component of contextual information if the first geographic location is not located near a geographic location at which the client is presently located; and assigning a high relevance score to the first component of contextual information if the first geographic location is located near a geographic location at which the client is presently located.

14. A non-transitory computer-readable storage medium with computer-executable instructions stored thereon for automatically loading data representing one or more credentials into a cache of a credential emulator located at a client, the instructions, when executed by one or more computer processors, cause the one or more computer processors to perform operations comprising:

acquiring contextual information indicative of one or more of a context of the client, a context of a user account affiliated with the client, and a context of a user of the client;

determining, using the contextual information, a context scenario into which the client presently fits, the context scenario defined, at least in part, by geographic location information;

identifying a respective set of credentials for which representative data is capable of being loaded into the cache of the credential emulator;

determining a respective likelihood of use for each credential in the set of credentials based, at least in part, on the context scenario and on data representing past credential usage by multiple other client devices, wherein the data representing past credential usage by multiple other client devices is data representing past credential usage by multiple other client devices during time intervals in which they fit into the same context scenario into which the client presently fits;

loading, from the set of credentials, a subset of credentials into the cache of the credential emulator, wherein the composition of the subset is based, at least in part, on the respective likelihoods of use, wherein credential emulation is limited to credentials stored in the cache of the credential emulator; and emulating the credential via a short range communicative connection to another device.

15. The non-transitory computer-readable storage medium of claim 14, wherein the computer readable medium is located at a device selected from a group consisting of: the client, a server, a smart phone, a tablet computer, a wearable computer, a laptop computer, and a desktop computer.

16. The non-transitory computer-readable storage medium of claim 14, wherein the respective likelihood of use for each credential in the set of credentials is a score indicative of a probability that the credential will be used.

17. The non-transitory computer-readable storage medium of claim 16, wherein the respective likelihood of use for each credential in the set of credentials is determined based additionally on past credential usage by the client.

18. The non-transitory computer-readable storage medium of claim 17, wherein the score is determined based, at least in part, on the context scenario.

19. The non-transitory computer-readable storage medium of claim 14, wherein the cache of the credential emulator contains both static slots and dynamic slots, wherein static slots hold data representative of credentials continuously until the credentials are removed or exchanged for other credentials through manual activity of a user and dynamic slots hold data that is automatically exchanged, based on contextual information, for data representative of other credentials.

20. The non-transitory computer-readable storage medium of claim 14, wherein the instructions for determining the respective likelihood of use for each credential in the set of credentials comprise:

instructions for determining a respective relevance score for each component of the contextual information, and instructions for determining the respective likelihood of use for each credential in the set of credentials based on the respective relevance scores determined for one or more components of the contextual information.

* * * * *